(12) United States Patent
Hashimoto

(10) Patent No.: US 9,497,353 B2
(45) Date of Patent: Nov. 15, 2016

(54) IMAGE PROCESSING APPARATUS, IMAGE PROCESSING METHOD, AND IMAGE PROCESSING SYSTEM

(71) Applicant: Ayumu Hashimoto, Kanagawa (JP)

(72) Inventor: Ayumu Hashimoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/743,337

(22) Filed: Jun. 18, 2015

(65) Prior Publication Data
US 2016/0028920 A1    Jan. 28, 2016

(30) Foreign Application Priority Data
Jul. 24, 2014 (JP) ................. 2014-150628

(51) Int. Cl.
  *H04N 1/405* (2006.01)
  *H04N 1/00* (2006.01)
  *H04N 1/64* (2006.01)

(52) U.S. Cl.
  CPC .......... *H04N 1/405* (2013.01); *H04N 1/00801* (2013.01); *H04N 1/00811* (2013.01); *H04N 1/644* (2013.01)

(58) Field of Classification Search
  CPC ............. H04N 1/40062; H04N 1/405; H04N 1/4072; H04N 2201/04713; H04N 2201/04781; H04N 1/58; H04N 2201/04722; H04N 1/4052; H04N 1/407; H04N 1/4105; H04N 1/56; H04N 1/6019; H04N 1/6027; H04N 1/6072
  USPC ...... 358/1.9, 3.06, 3.13, 518, 3.14, 2.1, 534, 358/1.2, 3.17, 3.2, 448, 1.15, 1.8, 3.12, 463, 358/464, 504, 300, 3.04, 3.05, 3.16, 3.19, 358/3.23, 3.26, 3.27, 406, 447, 488, 500, 358/502, 505, 538
  See application file for complete search history.

(56) References Cited

U.S. PATENT DOCUMENTS

| | | | | |
|---|---|---|---|---|
| 2006/0061840 A1* | 3/2006 | Kashibuchi | .......... | H04N 1/6033 358/518 |
| 2009/0034005 A1* | 2/2009 | Gotoh | ...................... | H04N 1/56 358/3.06 |
| 2009/0147313 A1 | 6/2009 | Miyagi et al. | | |
| 2009/0323089 A1* | 12/2009 | Hayasaki | ............... | H04N 1/644 358/1.9 |
| 2010/0128315 A1* | 5/2010 | Murakami | ........... | H04N 1/4052 358/3.06 |
| 2010/0220365 A1* | 9/2010 | Sasayama | .............. | B41J 2/2146 358/448 |
| 2010/0245870 A1* | 9/2010 | Shibata | .................. | G06K 9/033 358/1.9 |
| 2012/0014597 A1* | 1/2012 | Matsunaga | ............ | H04N 1/644 382/166 |
| 2013/0128286 A1* | 5/2013 | Tamagawa | ............. | G06K 15/02 358/1.2 |

(Continued)

FOREIGN PATENT DOCUMENTS

| | | |
|---|---|---|
| JP | 10-200737 | 7/1998 |
| JP | 2003-046722 | 2/2003 |

(Continued)

*Primary Examiner* — Negussie Worku
(74) *Attorney, Agent, or Firm* — Harness, Dickey & Pierce, PLC

(57) ABSTRACT

An image processing apparatus includes a reading unit, an acquisition unit, a determining unit, and a density correction unit. The reading unit reads a document to generate image data. The acquisition unit acquires color material reduction information reflecting a color material reduction process applicable to the document. The determining unit determines whether to correct the image data based on the acquired color material reduction information. The density correction unit performs a density correction process on the image data if the determining unit has determined to correct the image data.

20 Claims, 11 Drawing Sheets

(56) References Cited

U.S. PATENT DOCUMENTS

2013/0208998 A1* 8/2013 Yoshizawa ........... H04N 1/4051
                                                382/293
2014/0376808 A1* 12/2014 Hashimoto .............. G06K 9/38
                                                382/167

FOREIGN PATENT DOCUMENTS

| JP | 2003046772 | 2/2003 |
| JP | 2009-141618 | 6/2009 |
| JP | 2015-005959 | 1/2015 |

* cited by examiner

FIG. 4A
FIG. 4B
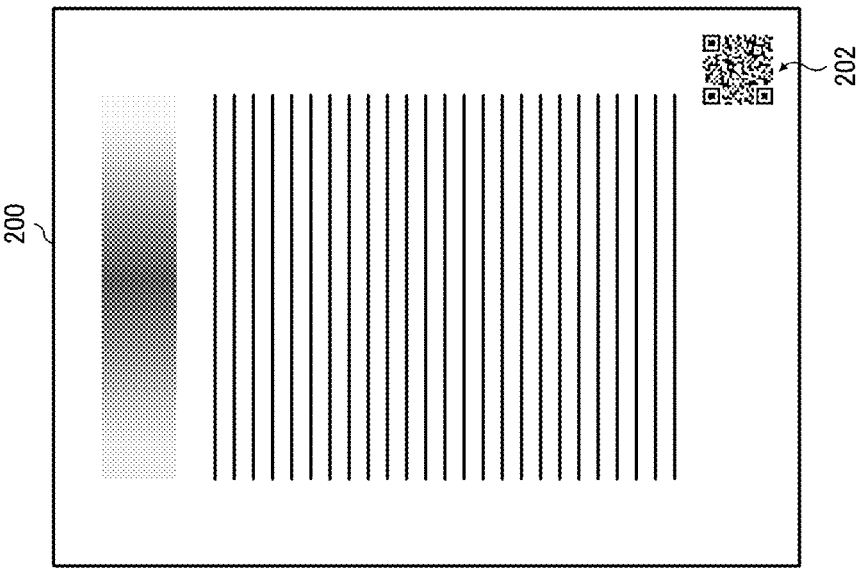
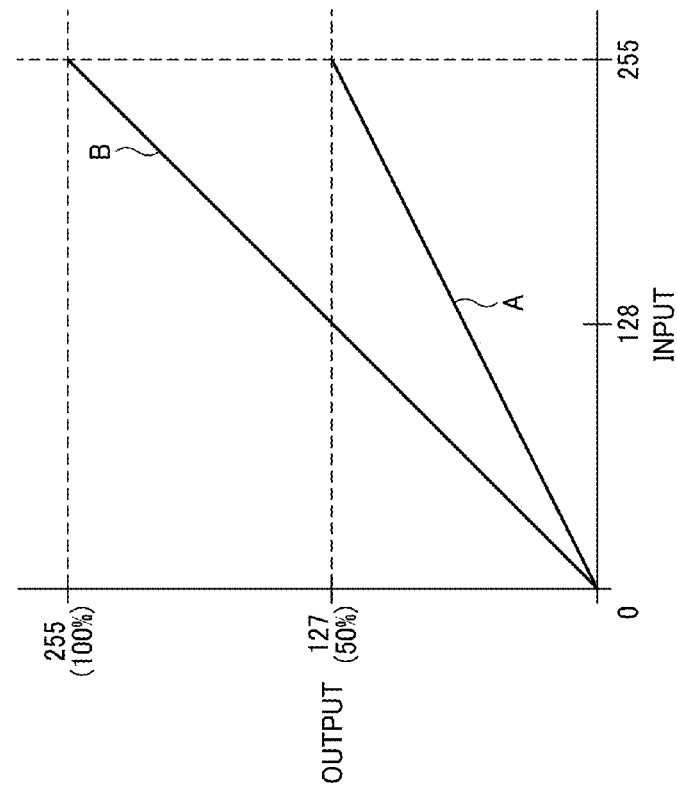

FIG. 8A
| NO. | COLOR MATERIAL REDUCTION INFORMATION | CORRECTION PARAMETER |
|---|---|---|
| 1 | REDUCTION RATE OF 30% | FIRST GAMMA CORRECTION TABLE |
| 2 | REDUCTION RATE OF 50% | SECOND GAMMA CORRECTION TABLE |
| 3 | REDUCTION RATE OF 70% | THIRD GAMMA CORRECTION TABLE |
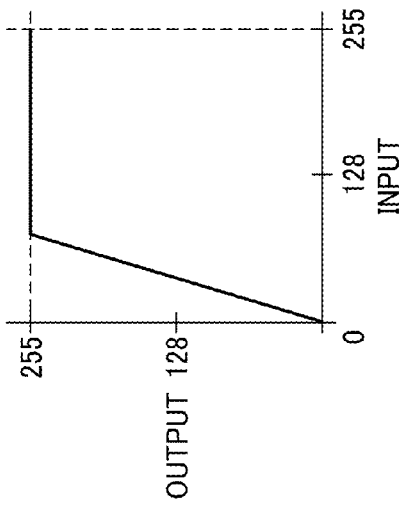
FIG. 8B
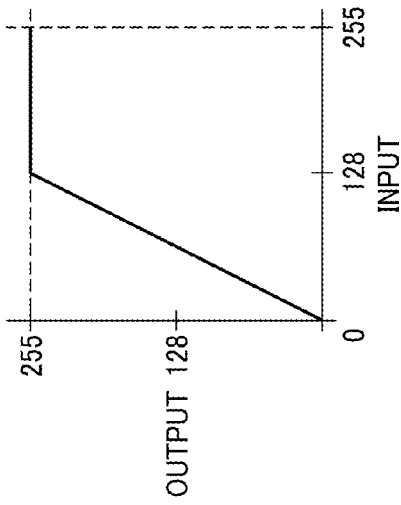
FIG. 8C
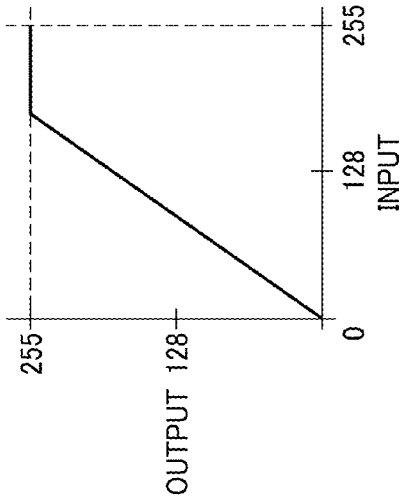
FIG. 8D

IMAGE PROCESSING APPARATUS, IMAGE PROCESSING METHOD, AND IMAGE PROCESSING SYSTEM

CROSS-REFERENCE TO RELATED APPLICATION

This patent application is based on and claims priority pursuant to 35 U.S.C. §119(a) to Japanese Patent Application No. 2014-150628, filed on Jul. 24, 2014, in the Japan Patent Office, the entire disclosure of which is hereby incorporated by reference herein.

BACKGROUND

1. Technical Field

This disclosure relates to an image processing apparatus, an image processing method, and an image processing system, and more specifically to an image processing apparatus, an image processing method, and an image processing system that read a document subjected to a color material reduction process.

2. Related Art

Some image processing apparatuses output an image after performing a color material reduction process in a toner save mode, for example, to save toner. In the toner save mode, an image processing apparatus performs halftone processing on image data to be output, in which respective output values of cyan, magenta, yellow, and black (CMYK) are reduced. The image processing apparatus may also provide an image to be output on a recording medium with information indicating whether or not the image is output in the toner save mode so as to make application or non-application of the toner save mode visibly recognizable.

If such a recording medium with the image output in the toner save mode is used as a document for copying, however, the reduction in density of text on the document and the halftone processing performed on the document may result in an error, such as an image portion that should be recognized as black text being identified and processed not as black text but as graphics, or being only partially recognized as black text and partially subjected to graphics processing or other processing, thereby outputting a defective image, for example. Further, if the recording medium with the image output in the toner save mode is used as a document for scanning and scanned image data is stored in an internal hard disk drive (HDD) of the image processing apparatus or in a content management system on a network, for example, data of text and graphics on the document is stored in low density. Although such a document may be subjected to gamma correction in the copying or scanning process, this approach requires a user to perform the adjustment and subsequent resetting to previous density values, which may be challenging to the user.

When the recording medium with the image output after being subjected to the color material reduction process in the toner save mode or the like is used as a document for copying or scanning, therefore, it is desirable to cancel effects of the color material reduction process on the output image and read an image with image characteristics similar to those of the image of an original document.

SUMMARY

In one embodiment of this disclosure, there is provided an improved image processing apparatus that includes, for example, a reading unit, an acquisition unit, a determining unit, and a density correction unit. The reading unit reads a document to generate image data. The acquisition unit acquires color material reduction information reflecting a color material reduction process applicable to the document. The determining unit determines whether to correct the image data based on the acquired color material reduction information. The density correction unit performs a density correction process on the image data if the determining unit has determined to correct the image data.

In one embodiment of this disclosure, there is provided an improved image processing method that includes, for example, reading a document to generate image data, acquiring color material reduction information reflecting a color material reduction process applicable to the document, determining whether to correct the image data based on the acquired color material reduction information, and performing a density correction process on the image data if the determining has determined to correct the image data.

In one embodiment of this disclosure, there is provided an improved image processing system that includes, for example, a color material reduction unit, a reading unit, an acquisition unit, a determining unit, and a density correction unit. The color material reduction unit performs a color material reduction process on image data to be output if the color material reduction process is requested. The reading unit reads a document having an image output thereon based on the image data subjected to the color material reduction process to generate image data. The acquisition unit acquires color material reduction information reflecting the color material reduction process. The determining unit determines whether to correct the generated image data based on the acquired color material reduction information. The density correction unit performs a density correction process on the generated image data if the determining unit has determined to correct the generated image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A is a diagram illustrating input-output characteristics for conversion used in regular image processing and image processing involving the color material reduction process according to the embodiment;

FIG. 4B is a diagram illustrating printed matter subjected to the color material reduction process according to the embodiment;

FIG. 8A is a diagram illustrating a data configuration of a table according to another embodiment of this disclosure associating color material reduction information items with correction parameters;

FIGS. 8B to 8D are diagrams illustrating input-output characteristics serving as correction parameters associated with respective color material reduction rates.

DETAILED DESCRIPTION

Figure 1:
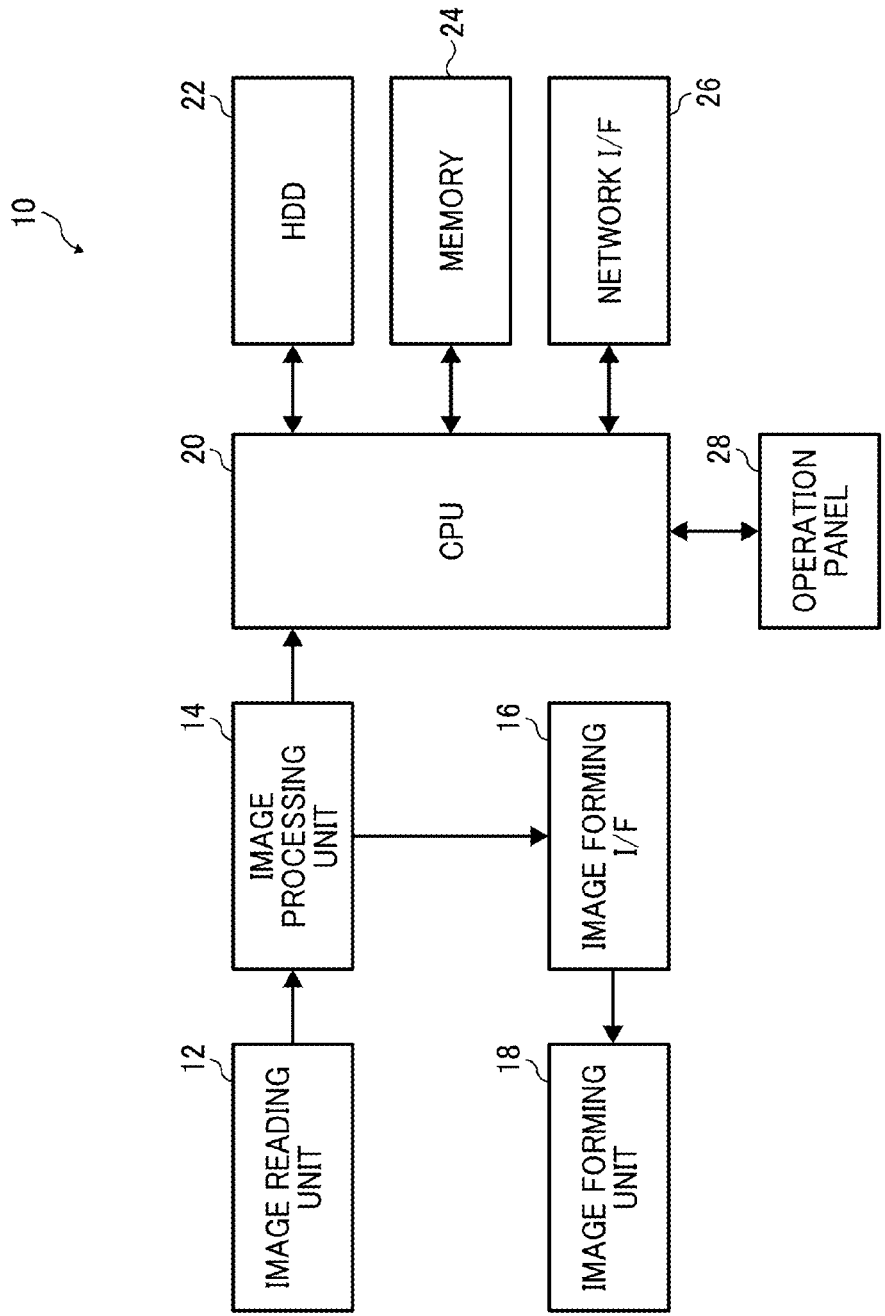
FIG. 1 is a diagram illustrating a hardware configuration of a multifunction peripheral according to an embodiment of this disclosure.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, embodiments of this disclosure will be described. The embodiments, however, do not limit this disclosure. In the following description, a multifunction peripheral including an image reading unit, an image forming unit, and an image processing unit will be described as an example of an image processing apparatus.

FIG. 1 is a diagram illustrating a hardware configuration of a multifunction peripheral 10 according to an embodiment of this disclosure. The multifunction peripheral 10 illustrated in FIG. 1 includes an image reading unit 12, an image processing unit 14, an image forming interface (I/F) 16, an image forming unit 18, a central processing unit (CPU) 20, a hard disk drive (HDD) 22, a memory 24 such as a random access memory (RAM), a network I/F 26, and an operation panel 28.

The image reading unit 12 is a scanner unit employing a charge coupled device (CCD) system or a contact image sensor (CIS) system, for example, but is not limited to a particular configuration. The image reading unit 12 reads the image of a document conveyed thereto by an automatic document feeder (ADF) or placed on an exposure glass thereof to generate and output red (R), green (G), and blue (B) image data based on density information of the document obtained by the image reading. The RGB image data is digital image data having a predetermined color depth (e.g., 8 bits for each of the RGB colors) and a predetermined resolution (e.g., 600 dpi).

The image processing unit 14 performs a variety of image processing on the RGB image data input from the image reading unit 12, and outputs the processed image data. In a copying process, the image processing unit 14 generates and outputs cyan (C), magenta (M), yellow (Y), and black (K) image data to the image forming I/F 16. In a scanned data storage process or a scanned data transmission process, the image processing unit 14 outputs the RGB image data to the HDD 22 or the network I/F 26, respectively. The image processing unit 14 is implemented by a substrate such as an application specific integrated circuit (ASIC), although the functions of the image processing unit 14 may be at least partially implemented by an instruction from the CPU 20.

The image forming I/F 16 receives the CMYK image data input by the image processing unit 14, and outputs the CMYK image data to a special interface of the image forming unit 18. In the present embodiment, the image forming unit 18 is a printer unit employing an electrophotographic system or an inkjet system, for example, but is not limited to a particular configuration. The image forming unit 18 receives the CMYK image data from the image processing unit 14 via the image forming I/F 16, forms an image on a transfer sheet (i.e., recording medium) through an electrophotographic process using a laser beam, for example, and outputs the image.

The CPU 20 is a microprocessor that controls the entire multifunction peripheral 10. The HDD 22 is a storage device for storing image data and information temporarily incident thereto. The memory 24 is a volatile memory for temporarily storing programs and intermediate processed data when the CPU 20 controls the multifunction peripheral 10. The network I/F 26 is an interface device for connecting the multifunction peripheral 10 to a network in accordance with a transmission control protocol/internet protocol (TCP/IP), for example. The image data and the information temporarily stored in the HDD 22 or held in the memory 24 may be transmitted to and stored in an external storage server, for example, via the network I/F 26. The operation panel 28 provides a user interface for operating the multifunction peripheral 10, and receives a variety of settings concerning copying, scanned data storage, scanned data transmission, and so forth.

In the present embodiment, the multifunction peripheral 10 is described as an example of the image processing apparatus, but does not limit this disclosure. It is therefore possible to configure the image processing apparatus as any apparatus having an image reading function, such as a copier, a scanner, or a facsimile machine, or as an image processing unit forming such apparatuses to perform image processing.

The above-described multifunction peripheral 10 is capable of copying a document, scanning a document and storing scanned image data in the HDD 22 of the multifunction peripheral 10, or scanning a document and transmitting scanned image data to an external computer, for example. The document may be a printed or copied recording medium, for example. If a recording medium output after being subjected to a color material reduction process is used as a document for copying or scanning, however, a reduction in density of text on the document and halftone processing performed on the document may result in an error, if sufficient countermeasures are not taken.

For instance, in a copying process, in which different image areas such as text areas and graphics areas are identified in the read image and various processes are performed depending on the image areas, an image portion that should be processed as black text may fail to be recognized as black text but processed as graphics instead, or may be only partially recognized as black text and partially subjected to graphics processing or other processing, thereby degrading the image quality. Further, text and graphics read from the document are reduced in density, making the read image indistinct.

The multifunction peripheral 10 according to the present embodiment, therefore, acquires color material reduction information reflecting color material reduction applicable to the document. Then, if the color material reduction information indicates that the input document has been subjected to the color material reduction process, the multifunction peripheral 10 performs a density correction process on the image data read from the document before proceeding to regular image processing. With the density correction process, the effects of the color material reduction process performed on the document are cancelled to obtain a density close to that of the image of the original document not subjected to the color material reduction process, and thereafter a variety of processes are performed on the image data. Accordingly, the image quality of the output image is improved.

Figure 2:
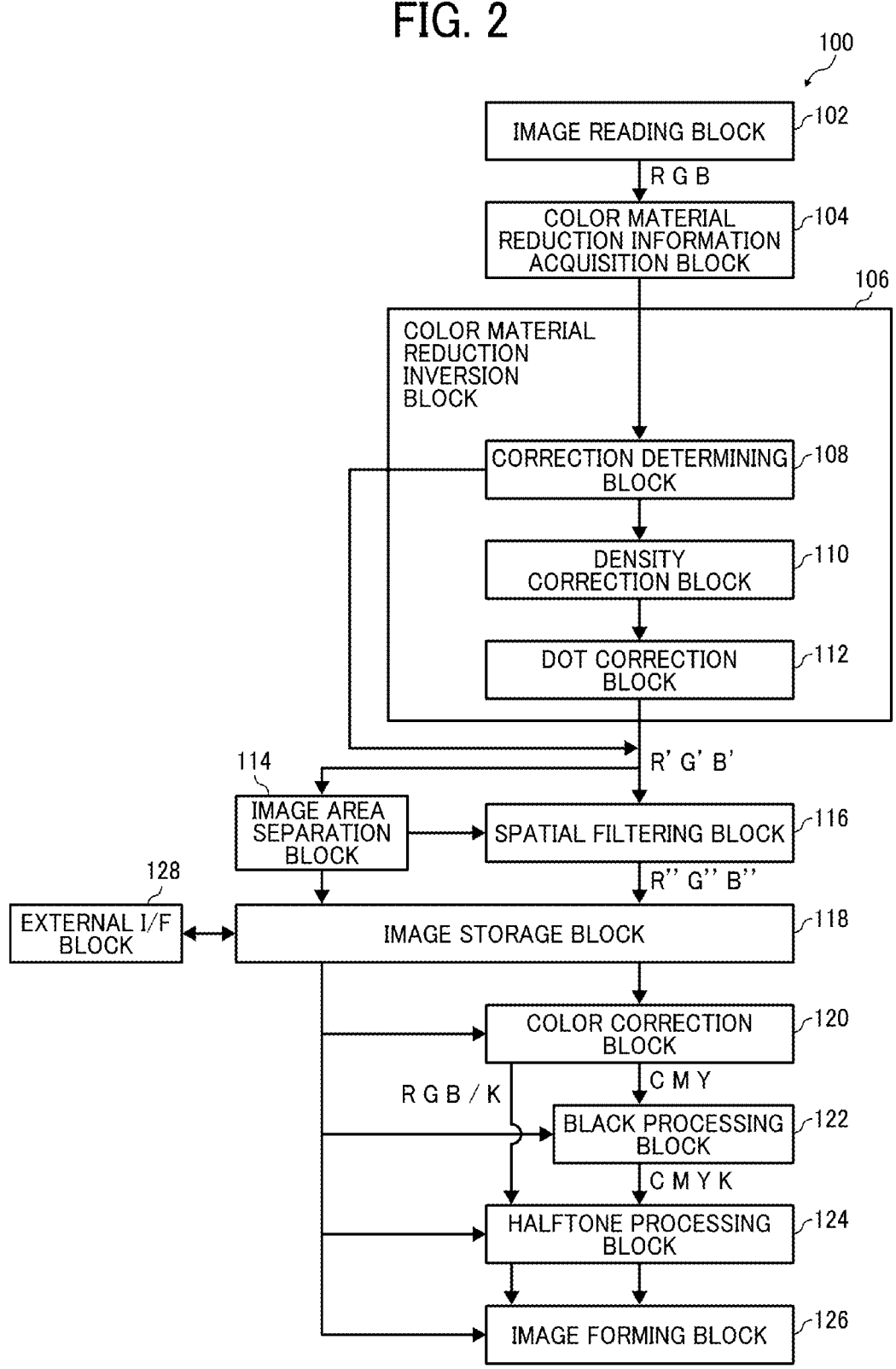
FIG. 2 is a diagram illustrating functional blocks and image processing paths in the multifunction peripheral according to the embodiment.

FIG. 2 is a diagram illustrating functional blocks and image processing paths in the multifunction peripheral 10 according to the present embodiment. FIG. 2 illustrates the multifunction peripheral 10 as an embodiment of a color image forming apparatus and a typical order of steps in an image processing method performed by the multifunction peripheral 10. As illustrated in FIG. 2, the multifunction peripheral 10 includes a functional block 100 including an image reading block 102, a color material reduction information acquisition block 104, a color material reduction inversion block 106, an image area separation block 114, a spatial filtering block 116, an image storage block 118, a color correction block 120, a black processing block 122, a halftone processing block 124, an image forming block 126, and an external I/F block 128.

The image reading block 102, which is implemented by the image reading unit 12 in FIG. 1, reads a document and generates and outputs RGB image data in accordance with an instruction from a user of the multifunction peripheral 10 to copy the document, scan the document and store scanned data, or scan the document and transmit scanned data, for example.

The color material reduction information acquisition block 104 acquires the color material reduction information reflecting the color material reduction process applicable to the document, from which the RGB image data is read by the image reading block 102. Whether or not the document has been subjected to the color material reduction process is determined based on the color material reduction information. The color material reduction information acquisition block 104 serves as an acquisition unit that acquires the color material reduction information. A process of acquiring the color material reduction information will be described in detail later.

The color material reduction inversion block 106 performs a color material reduction inversion process on the input RGB image data based on the color material reduction information acquired by the color material reduction information acquisition block 104, and outputs R'G'B' image data. The color material reduction inversion process is a correction process for cancelling the effects of the color material reduction process performed on the document to obtain image characteristics close to those of the image of the original document not subjected to the color material reduction process.

More specifically, the color material reduction inversion block 106 includes a correction determining block 108, a density correction block 110, and a dot correction block 112. The correction determining block 108 first determines whether or not to correct the image data based on the color material reduction information acquired by the color material reduction information acquisition block 104. Preferably, if having determined to correct the image data, the correction determining block 108 may further determine a correction parameter suitable for the correction based on the color material reduction information. The color material reduction inversion block 106 (more specifically, the correction determining block 108) serves as a determining unit that determines whether or not to correct the image data based on the acquired color material reduction information.

If the correction determining block 108 has determined to perform the correction, the density correction block 110 performs the density correction process on the RGB image data with the correction parameter determined based on the color material reduction information. In a document subjected to the color material reduction process, the density is normally reduced in each of color materials. The density correction block 110 serves as a density correction unit that performs the density correction process on the input RGB image data to obtain an image close to the image of the original document not subjected to the color material reduction process.

If the correction determining block 108 has determined to perform the correction, the dot correction block 112 performs spatial filtering on the RGB image data to smooth a halftone-processed portion of the RGB image data. The document subjected to the color material reduction process is output after being subjected to density reduction and subsequent dot processing. The dot correction block 112 serves as a halftone correction unit that corrects such dots to obtain an image close to the image of the original document not subjected to the color material reduction process. Note that the present embodiment is configured to perform dot correction after density correction, but is not limited to such a configuration.

The image area separation block 114 receives the R'G'B' image data processed by the color material reduction inversion block 106, and separates the R'G'B' image data into different image areas based on the characteristics of pixels forming the R'G'B' image data, such as edge or non-edge, text or non-text, chromatic or achromatic, and dot or non-dot, for example. A technique disclosed in Japanese Unexamined Patent Application Publication No. 2003-046772, the entire contents of which is hereby incorporated by reference herein, for example, may be referred to for details of a specific process performed by the image area separation block 114. The image area separation block 114 according to the present embodiment serves as an image area separation unit that separates the RGB image data subjected to the density correction performed by the density correction block 110 into image areas.

The spatial filtering block 116 performs a process of emphasizing and smoothing the R'G'B' image data processed by the color material reduction inversion block 106 based on an image area separation result and an edge amount of the image obtained by the image area separation block 114, and outputs R"G"B" image data. The spatial filtering block 116 varies processing in accordance with the separated image areas to sharpen text areas and smooth dot areas, thereby suppressing moire.

The image storage block 118 stores the R"G"B" image data subjected to the spatial filtering and the image area separation result obtained by the image area separation block 114 in a storage device such as the HDD 22. The stored R"G"B" image data may be kept in the HDD 22 or transmitted to and from an external apparatus such as a storage server via the external I/F block 128. In a normal copying process, the temporarily stored R"G"B" image data and image area separation result are read and transmitted to the color correction block 120 and subsequent functional blocks for further image processing.

The color correction block 120 and the black processing block 122 convert the spatially filtered R"G"B" image data in the RGB color space into CMYK image data in the CMYK color space and outputs the CMYK image data. The color correction block 120 converts RGB signals into CMY signals corresponding to the colors of toners in the image forming unit 18. In this process, for example, the color correction block 120 switches between a color correction parameter for text and a color correction parameter for graphics, which are previously prepared, in accordance with the image area separation result. The black processing block 122 controls a K signal for generating black color. The black processing block 122 generates the K signal in accordance with the CMY signals, and performs an undercolor removal process of reducing the toner amount in accordance with the K signal instead of the CMY signals. In this process, a black color generation rate is changed in accordance with the image areas based on the image area separation result and the edge amount obtained by the image area separation block 114. For example, the black color generation rate is increased in text areas and reduced in low-chroma gray patch areas in order to improve the image quality of the output image.

The halftone processing block 124 performs pseudo-halftone processing, such as dithering and error diffusion, to convert the CMYK image data having a predetermined color depth (e.g., 8 bits for each of the colors) into image data having a predetermined number of gradations (e.g., 2 bits for each of CMYK colors) to be processed by the image forming unit 18. The image forming block 126, which is implemented by the image forming unit 18, forms an image through an electrophotographic process, for example, based on the CMYK image data generated in the halftone processing performed by the halftone processing block 124, and outputs the generated image.

The external I/F block 128, which is implemented by the network I/F 26 in FIG. 1, transmits and receives image data to and from an external apparatus via a network connected to the external I/F block 128.

The blocks in the functional block 100 excluding the image reading block 102, the image forming block 126, and the external I/F block 128 are implemented by the image processing unit 14 in FIG. 1.

Figure 3:
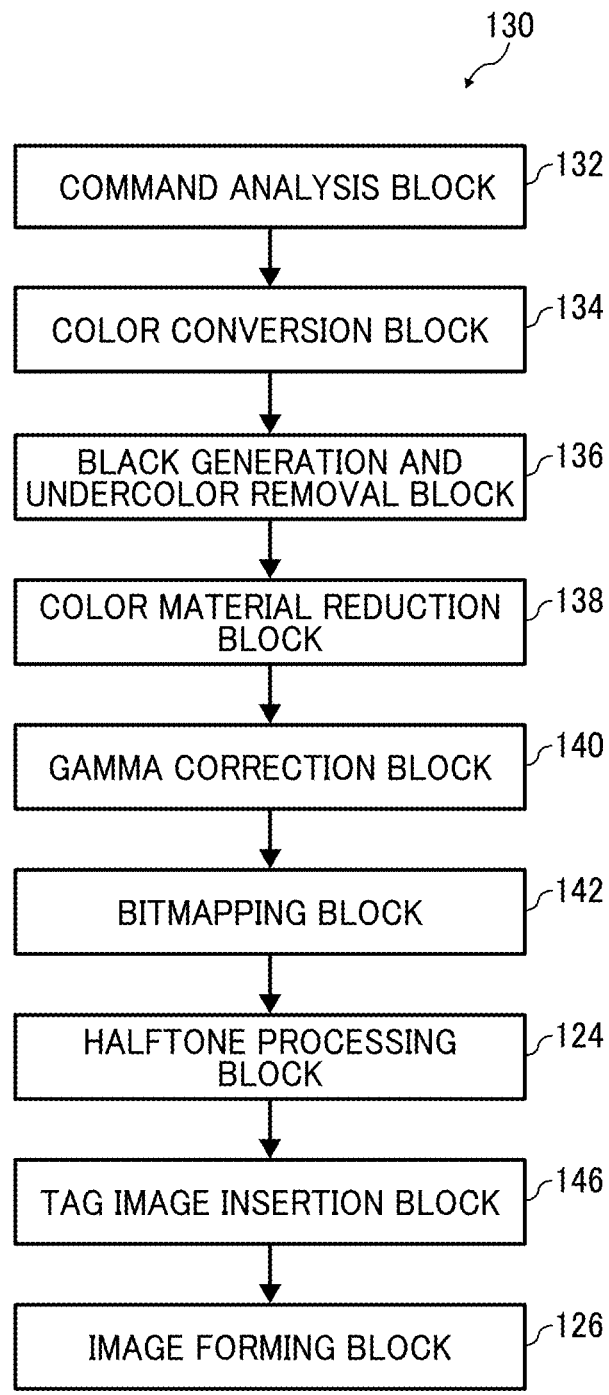
FIG. 3 is a diagram illustrating functional blocks related to a printing process involving a color material reduction process in the multifunction peripheral according to the embodiment.

With reference to FIG. 3 and FIGS. 4A and 4B, an image forming process involving the color material reduction process will first be described before discussing the color material reduction inversion process.

FIG. 3 is a diagram illustrating functional blocks related to a printing process involving the color material reduction process in the multifunction peripheral 10 according to the present embodiment. FIGS. 4A and 4B are diagrams illustrating the color material reduction process and a recording medium output after being subjected to the color material reduction process.

FIG. 3 illustrates a functional block 130 related to the printing process involving the color material reduction process. The functional block 130 includes a command analysis block 132, a color conversion block 134, a black generation and undercolor removal block 136, a color material reduction block 138, a gamma correction block 140, a bitmapping block 142, the halftone processing block 124, a tag image insertion block 146, and the image forming block 126.

The blocks in the functional block 130 excluding the image forming block 126 are implemented by the image processing unit 14 in FIG. 1.

Print data transmitted to the multifunction peripheral 10 from an external host apparatus is input to the command analysis block 132. The command analysis block 132 acquires original image data and color material reduction specifying information that specifies execution or non-execution of the color material reduction process included in print settings. The command analysis block 132 analyzes a variety of commands included in the print data described in the page description language (PDL), and acquires information such as the type of each object to be rendered (e.g., text, graphics, or image), the position and size of the object, color information as to whether the object is colored or monochrome, color values (e.g., KRGB values), and font information of text, based on rendering commands included in the variety of commands.

If the object is to be rendered in color, the color conversion block 134 and the black generation and undercolor removal block 136 perform a process of converting the RGB colors into the CMYK colors corresponding to the three primary colors of color materials. The color conversion block 134 first converts the RGB color signals into the CMY color signals, and then the black generation and undercolor removal block 136 generates the K signal, to thereby obtain the CMYK color signals.

Based on the color material reduction specifying information and previously stored input-output characteristics illustrated in FIG. 4A, the color material reduction block 138 converts the CMYK values in the rendering commands corresponding to respective objects output from the black generation and undercolor removal block 136.

The color material reduction block 138 (i.e., a color material reduction unit) converts the CMYK values in the rendering commands in accordance with an input-output characteristic A in FIG. 4A when the color material reduction specifying information specifies the execution of the color material reduction process, and converts the CMYK values in the rendering commands in accordance with an input-output characteristic B in FIG. 4A when the color material reduction specifying information specifies the non-execution of the color material reduction process, i.e., the execution of regular image formation. In the input-output characteristic A for image formation involving the color material reduction process, the gradient of the output value relative to the input value is set to halve the overall image density for the regular image formation, for example. If the color material reduction process is specified, therefore, the CMYK colors are rendered lighter than in regular image formation.

The gamma correction block 140 converts the CMYK values in the rendering commands output from the color material reduction block 138 based on the input-output characteristics according to the image forming unit 18. With this conversion, gamma correction is performed to adjust the CMYK values in the respective objects to suit the image forming unit 18 of the multifunction peripheral 10. The bitmapping block 142 develops an image in bitmap format in a rendering memory area provided by the memory 24, for example, based on the gamma-corrected rendering commands output from the gamma correction block 140. The halftone processing block 124 performs halftone processing, such as dithering, on the bitmap image. For example, the halftone processing block 124 performs halftone processing by dithering the image having a color depth of 8 bits for each of the CMYK colors to express the image in 2-bit gradations for each of the CMYK colors. The halftone-processed bitmap image is stored page by page in a memory.

The tag image insertion block 146 (i.e., an addition unit) stores data of a tag image in the bitmap format. The tag image indicates that the color material reduction process is performed. If the color material reduction specifying information specifies the execution of the color material reduction process, the tag image insertion block 146 adds the tag image to the above-described bitmap image subjected to the halftone processing. In this process, the tag image is added to a predetermined area (e.g., footer) in a page layout on a recording medium, onto which the image is to be output. Consequently, as illustrated in FIG. 4B, for example, output image data 200 is prepared which includes a tag image 202 in the footer and a main image including text, graphics, and so forth subjected to the color material reduction process in an area other than the header and the footer. The image forming block 126 forms an image through an electrophotographic process, for example, based on the output image data 200 including the tag image 202, and outputs the image.

Alternatively, the tag image may be added to the header or to another area. Further, the tag image may be a two-dimensional code such as a quick response (QR) code (registered trademark), like the tag image 202 illustrated in FIG. 4B, a different type of embedded code such as a one-dimensional barcode, or an image including a character string and a mark perceptible or imperceptible to humans but extractable by the image reading unit 12.

When the multifunction peripheral 10 processes a document having the above-described tag image, the color material reduction information acquisition block 104 illustrated in FIG. 2 analyzes the RGB image data read and input by the image reading block 102. The tag image added to the document when the document is subjected to the color material reduction process and the subsequent image output, such as the tag image 202 in FIG. 4B, is detected in this analysis, and the information indicated by the tag image is extracted to acquire the color material reduction information. Accordingly, whether or not the document to be read has been subjected to the color material reduction process is determined based on the color material reduction information detected and acquired as described above.

The present method of acquiring the color material reduction information from the tag image reduces errors in identifying documents subjected to the color material reduction process, and saves the user extra work in copying, storing scanned data, or transmitting scanned data.

In the present embodiment, the input-output characteristic for use in the color material reduction process is previously known, and the color material reduction information simply indicates whether or not the document has been subjected to the color material reduction process. As described in detail below, however, the color material reduction information may preferably indicate the intensity of the color material reduction process. In this case, the correction parameter for the density correction process may be selected in accordance with the extracted intensity of the color material reduction process.

With reference to FIGS. 5A to 5C and FIGS. 6A to 6F, the color material reduction inversion process will now be described in more detail.

Figure 5A:
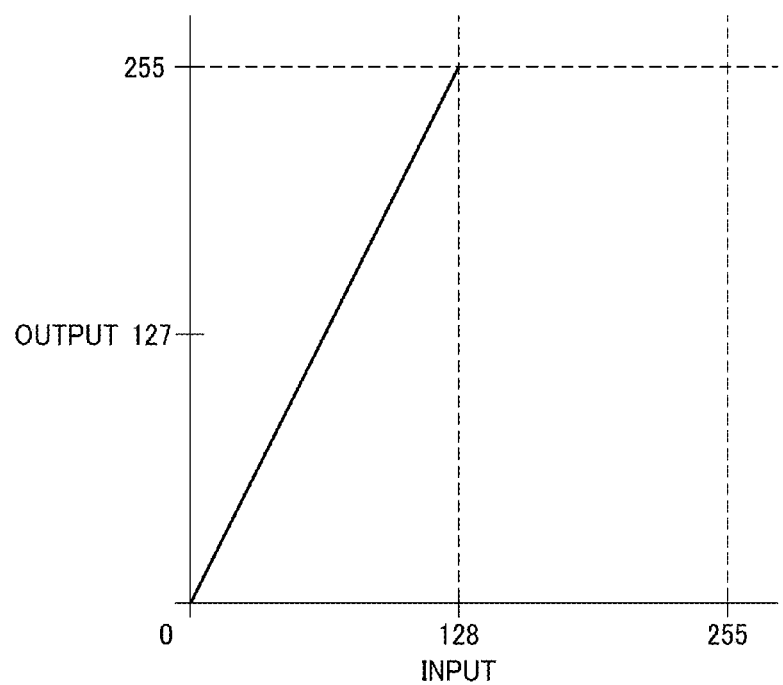
FIG. 5A is a diagram illustrating an input-output characteristic used as a correction parameter for a density correction process according to the embodiment.
Figure 5B:
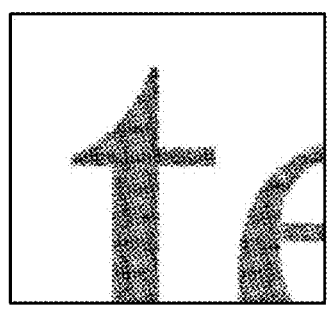
FIGS. 5B and 5C are diagrams illustrating dot correction according to the embodiment.
Figure 5C:
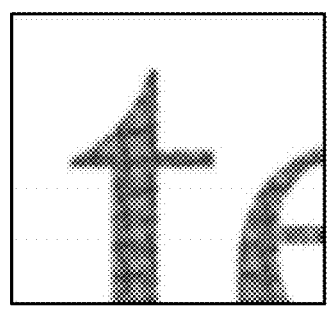

FIGS. 5A to 5C illustrate the color material reduction inversion process performed on a document subjected to the color material reduction process. As described above, to convert the input image data into image data close to the image data of the original document not subjected to the color material reduction process, it is necessary to first perform the density correction process, in which the density distribution biased toward lower density values (i.e., larger brightness values) by the color material reduction process is expanded toward higher density values (i.e., smaller brightness values).

FIG. 5A is a diagram illustrating an input-output characteristic used as a correction parameter for such a density correction process. The correction parameter illustrated in FIG. 5A is prepared for each of the RGB colors. It is to be noted that, for ease of illustration, a pixel value of 0 and a pixel value of 255 herein represent the red, green, or blue color at the maximum brightness level and the black color at the minimum brightness level, respectively. According to the input-output characteristic in FIG. 5A serving as the correction parameter, inputs ranging from a pixel value of 0 to a pixel value of 128, i.e., an intermediate value in 8-bit image, are subjected to gamma correction to obtain outputs ranging from a pixel value of 0 to a pixel value of 255, i.e., the maximum value in 8-bit image. A pixel value exceeding the intermediate value of 128 is generally adjusted to the pixel value of 255. The density correction block 110 converts the image data based on such an input-output characteristic, thereby allowing printout, storage, or transmission of image data having a density close to that of the image of the original document.

Further, as described above, the document is halftone-processed and output after being subjected to the color material reduction process. Thus, a solid portion such as black text is also rendered in dots. To convert the input image data into image data close to that of the original document, therefore, it is desirable to perform a process of correcting the dots in addition to the density correction process. FIGS. 5B and 5C are diagrams illustrating a dot correction process performed on such image data. The dot correction block 112 performs spatial filtering on the image read from the document subjected to the dot processing, such as an image illustrated in FIG. 5B, to obscure the dots to some extent, as in an image illustrated in FIG. 5C, thereby allowing printout, storage, or transmission of image data having characteristics close to those of the image data of the original document. The above-described spatial filtering may be moving average filtering or Gaussian filtering, for example.

Figure 6C:
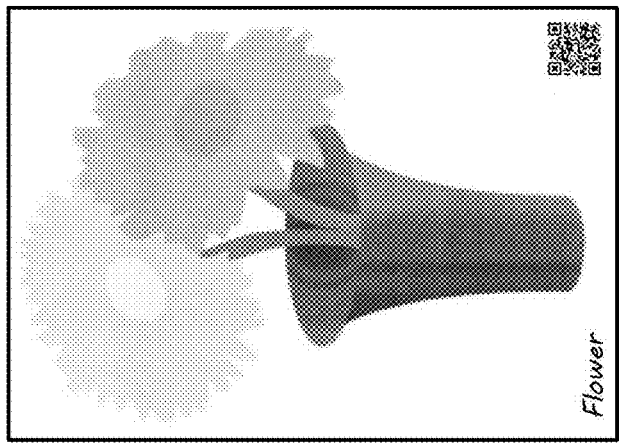
FIGS. 6A to 6F are diagrams illustrating effects of a color material reduction inversion process according to the embodiment for obtaining image characteristics close to those of the image of an original document by performing the density correction process and the dot correction process.
Figure 6B:
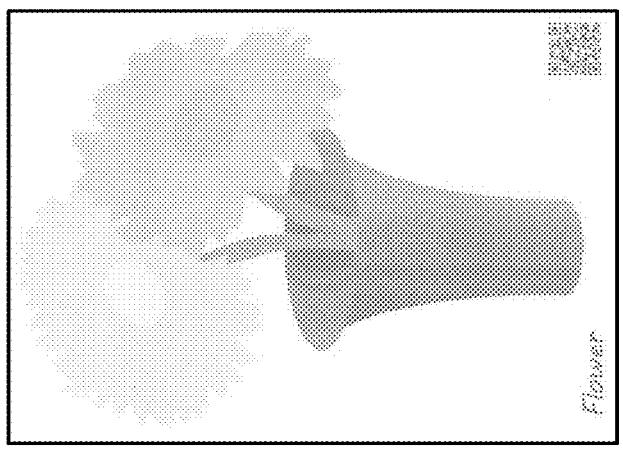
Figure 6A:
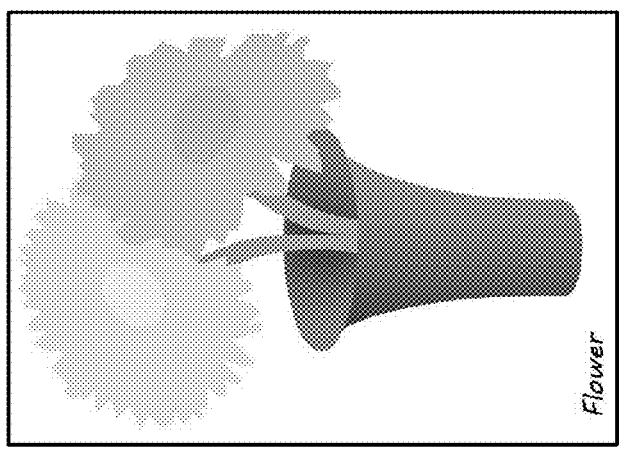
Figure 6D:
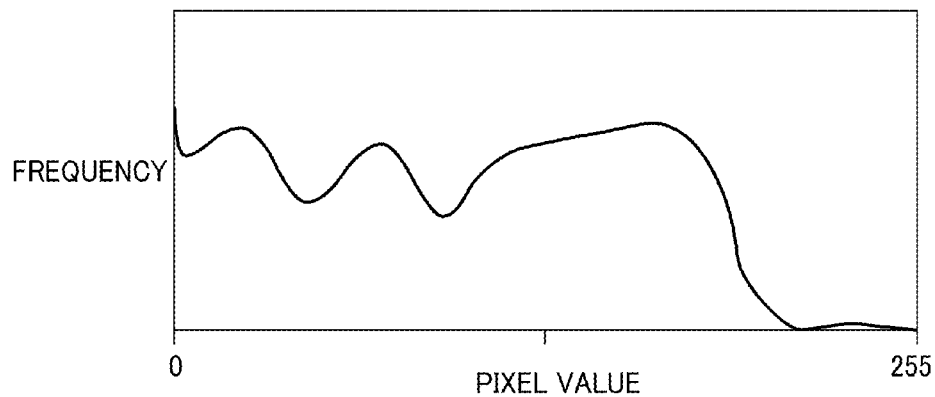
Figure 6E:
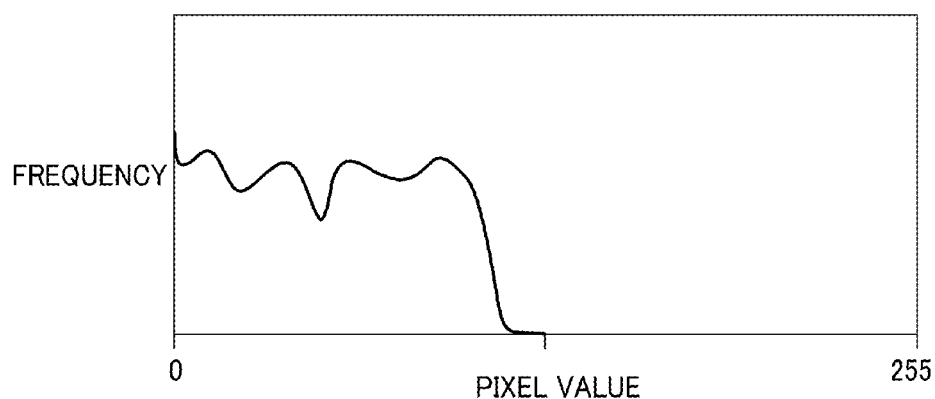
Figure 6F:
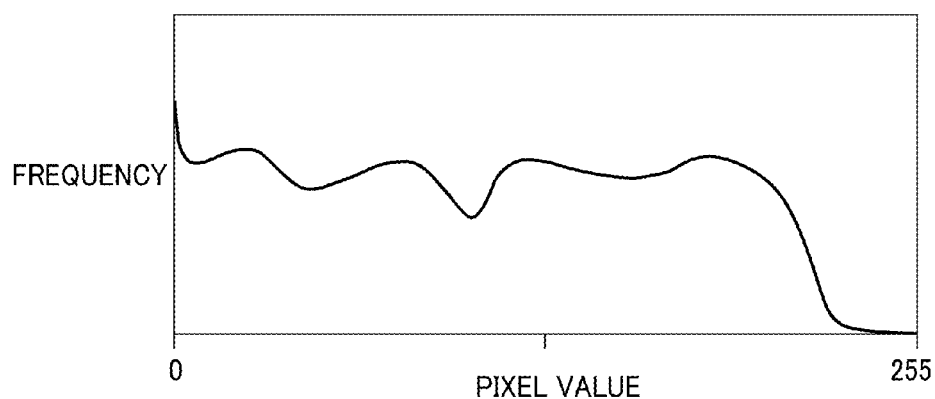

FIGS. 6A to 6F are diagrams illustrating effects of the color material reduction inversion process according to the present embodiment for obtaining image characteristics close to those of the image of the original document by performing the density correction process and the dot correction process on the image data read from a document subjected to the color material reduction process. FIGS. 6A, 6B, and 6C illustrate image data of the original document, image data obtained by scanning the document subjected to the color material reduction process, and corrected image data obtained by performing the density correction process and the dot correction process on the image data, respectively. Further, FIGS. 6D, 6E, and 6F are diagrams schematically illustrating density histograms representing density distributions in the original image data in FIG. 6A, the image data in FIG. 6B, and the corrected image data in FIG. 6C, respectively. In the density histograms, the lightness is maximized with the pixel value of 0 and minimized with the pixel value of 255.

As illustrated in FIGS. 6A to 6F, if printed matter having the original image data as illustrated in FIG. 6A printed thereon is scanned, the resultant image data is reduced in density to be lighter overall, as illustrated in FIG. 6B. Further, in the image data, solid portions reduced in density are subjected to the dot processing. The density histograms illustrated in FIGS. 6D and 6E reveal that, in the image data, the distribution of pixel values is biased toward the lower density side, i.e., the lighter side, by the color material reduction process.

Further, the corrected image data in FIG. 6C and the corresponding density histogram in FIG. 6F reveal that the corrected image data in FIG. 6C is much closer to the original image data in FIG. 6A than the image data in FIG. 6B in the range of the density distribution.

As described above, according to the present embodiment, a variety of processing takes place after the execution of the density correction process that cancels the effects of the color material reduction process performed on the document to obtain image data having characteristics close to those of the image data of the original document not subjected to the color material reduction process. According to the present embodiment, the density correction process and the dot correction process precede the image area separation, which reduces errors in the image area separation. Even if an image portion that should be processed as black text is processed as graphics without being identified as black text or is only partially identified as black text in the subsequent printing process, therefore, the present embodiment reduces the deterioration in image quality of the output image due to a mixture of text processing and other processing such as graphics processing. Further, according to the present embodiment, text and graphics read from the document have a density close to that of the original image, thereby allowing the storage of an image visually close to the image of the original document.

In the process of acquiring the color material reduction information according to the present embodiment, the tag image added to the document when the document is subjected to the color material reduction process and the subsequent image output is detected from the image data to acquire the color material reduction information.

With reference to FIGS. 7A to 7F and FIGS. 8A to 8D, a description will now be given of another embodiment in which the execution or non-execution of the color material reduction process and the intensity of the color material reduction process are determined based on the image data.

According to this embodiment, the color material reduction information acquisition block 104 acquires the color material reduction information by estimating whether or not the color material reduction process has been performed on the document based on the density distribution in the input RGB image data. Further, the color material reduction information acquisition block 104 preferably acquires the color material reduction information by estimating the intensity of the color material reduction process performed on the document based on the density distribution in the input RGB image data. This configuration allows the density correction block 110 to perform the density correction process in accordance with the intensity of the color material reduction process indicated by the color material reduction information.

Figure 7A:
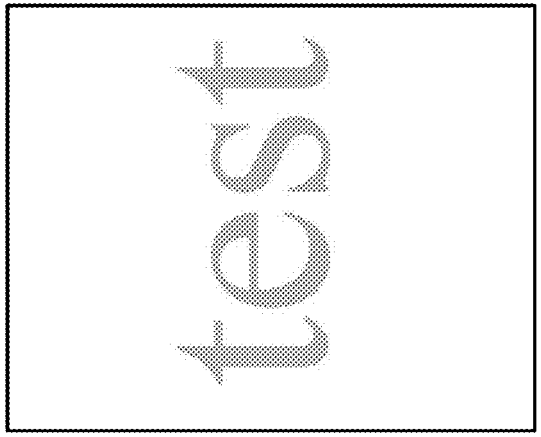
FIG. 7A is a diagram illustrating an example of image data read from a document not subjected to the color material reduction process.
Figure 7B:
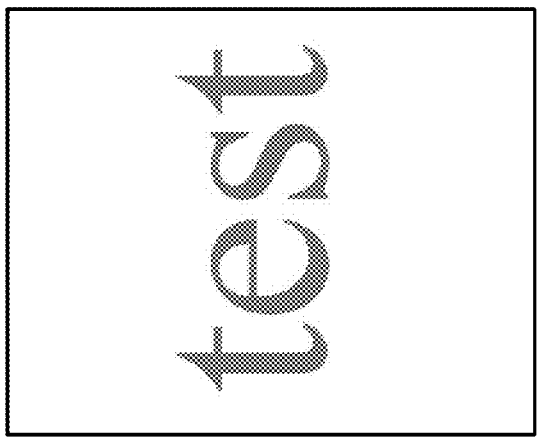
FIG. 7B is a diagram illustrating an example of image data read from a document subjected to the color material reduction process at a given intensity level.
Figure 7C:
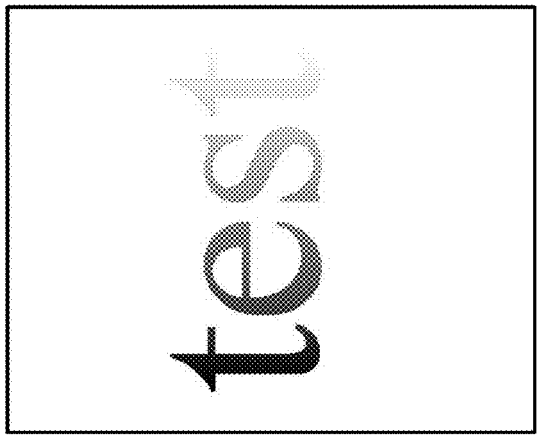
FIG. 7C is a diagram illustrating an example of image data read from a document subjected to the color material reduction process at another intensity level.
Figure 7D:
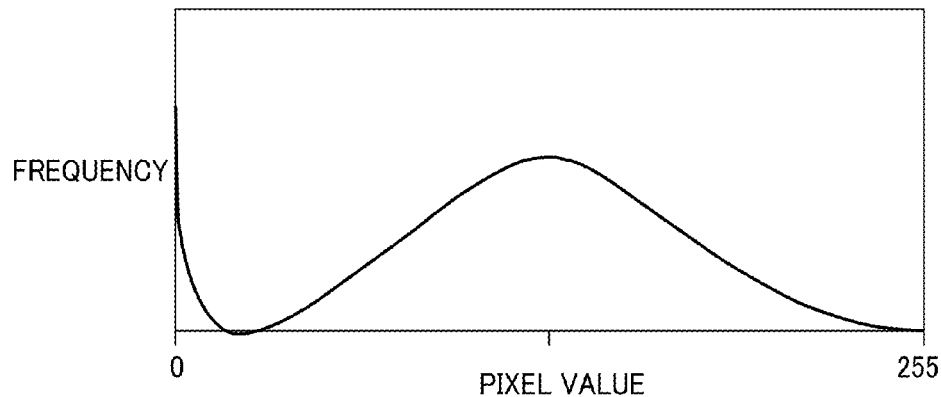
FIGS. 7D to 7F are diagrams schematically illustrating density histograms in the image data examples in FIGS. 7A to 7C, respectively.
Figure 7E:
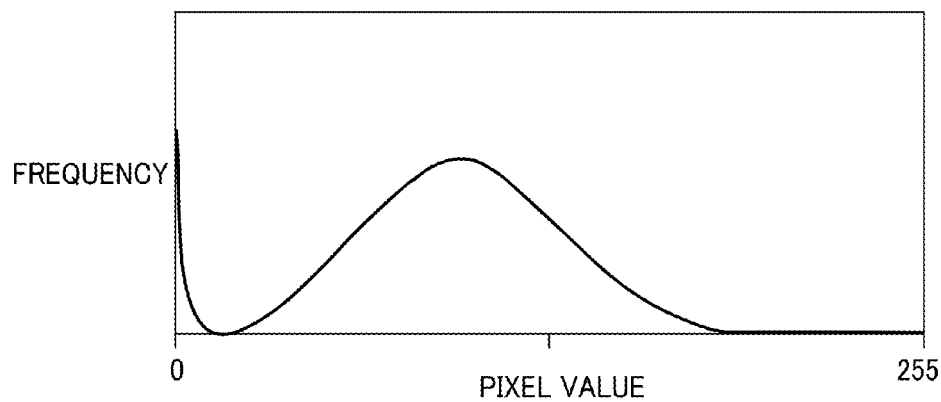
Figure 7F:
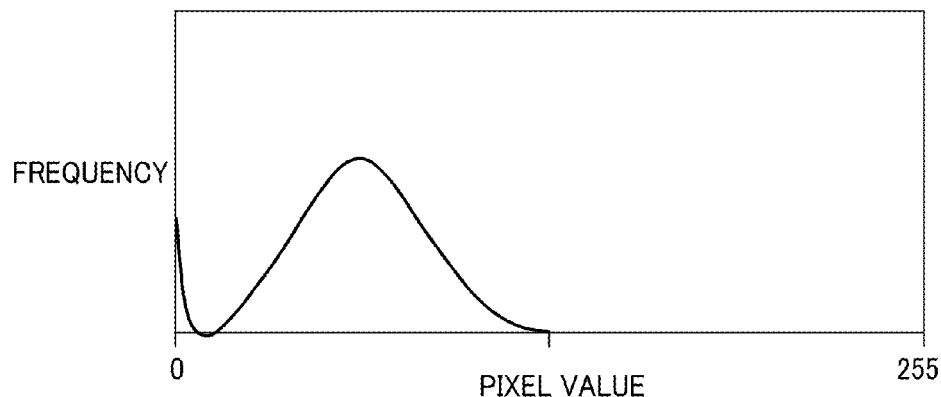

FIG. 7A illustrates an example of image data read from a document not subjected to the color material reduction process, and FIG. 7D schematically illustrates a density histogram representing the density distribution in such image data. FIG. 7B illustrates an example of image data read from a document subjected to a color material reduction process for reducing the color materials by 30%, and FIG. 7E schematically illustrates a corresponding density histogram. FIG. 7C illustrates an example of image data read from a document subjected to a color material reduction process for reducing the color materials by 50%, and FIG. 7F schematically illustrates a corresponding density histogram.

As illustrated in FIGS. 7A and 7D, in the image data read from the document not subjected to the color material reduction process, the distribution basically extends over all pixel values. By contrast, in the image data subjected to the color material reduction process, the density is reduced overall with few pixel values distributed over a certain density level, as illustrated in FIGS. 7B, 7C, 7E, and 7F.

For example, if the document is subjected to the color material reduction process for reducing the color materials by 30%, only about 70% of all pixel values seems to be present in the read image, as illustrated in FIG. 7E. Further, if the document is subjected to the color material reduction process for reducing the color materials by 50%, only about 50% of all pixel values seems to be present in the read image, as illustrated in FIG. 7F. FIGS. 7A to 7F illustrate model cases and do not exactly guarantee that there is no pixel value higher than the certain density level, and actual pixel values are subject to factors such as reading sensitivity.

According to the present embodiment, the color material reduction information acquisition block 104 creates a density histogram from the input image data, and detects a pixel value, the number of which exceeds a predetermined threshold. Then, if the detected pixel value reaches or exceeds a predetermined value (e.g., a value corresponding to a density equal to or higher than 70%), the color material reduction information acquisition block 104 determines that the color material reduction process has not been performed on the image data, and acquires color material reduction information indicating no color material reduction. Further, if the detected pixel value, the number of which exceeds the predetermined threshold, falls in a first range (e.g., corresponding to a density range equal to or higher than 50% and lower than 70%), the color material reduction information acquisition block 104 determines that the color material reduction process for reducing the color materials by 30% has been performed on the image data, and acquires color material reduction information indicating a color material reduction rate of 30%. Further, if the detected pixel value falls in a second range (e.g., corresponding to a density range equal to or higher than 30% and lower than 50%), the color material reduction information acquisition block 104 determines that the color material reduction process for reducing the color materials by 50% has been performed on the image data, and acquires color material reduction information indicating a color material reduction rate of 50%. Further, if the detected pixel value falls in a third range (e.g., corresponding to a density range equal to or higher than 0% and lower than 30%), the color material reduction information acquisition block 104 similarly acquires color material reduction information indicating a color material reduction rate of 70%.

According to the present embodiment, the density correction block 110 selects a correction parameter associated with the value of the acquired color material reduction information with reference to a table that associates correction parameters with color material reduction information items, such as a table illustrated in FIG. 8A. FIGS. 8B, 8C, and 8D illustrate examples of correction parameters corresponding to color material reduction rates of 30%, 50%, and 70%, respectively.

The image density is reduced with an increase in the color material reduction rate. As illustrated in FIGS. 8B to 8D, therefore, the density may be inversely corrected such that the output relative to the input is increased with the increase in the color material reduction rate. That is, in the case of a small reduction rate of 30%, for example, the inversion may be performed with a correction parameter having a small gradient, as illustrated in FIG. 8B. Conversely, in the case of a large reduction ratio of 70%, for example, the inversion may be performed with a correction parameter having a large gradient, as illustrated in FIG. 8D.

More specifically, if the color material reduction information indicates the color material reduction process with the reduction rate of 30%, conversion may be performed with a first correction parameter (i.e., first gamma correction table) for converting 0% to 70% inputs into 0% to 100% outputs, as illustrated in FIG. 8B. Similarly, if the color material reduction information indicates the color material reduction process with the reduction ratio of 50%, conversion may be performed with a second correction parameter (i.e., second gamma correction table) for converting 0% to 50%% inputs into 0% to 100% outputs, as illustrated in FIG. 8C. Further, if the color material reduction information indicates the color material reduction process with the reduction ratio of 70%, conversion may be performed with a third correction parameter (i.e., third gamma correction table) for converting 0% to 30% inputs into 0% to 100% outputs, as illustrated in FIG. 8D.

The above-described acquisition process based on the density distribution in the image data enables the determination of whether or not the color material reduction process has been performed on a document even if the tag image is not included in the document. Further, the determination is automatically performed, thereby saving the user extra work in the process of copying, storing scanned data, or transmitting scanned data. In particular, the present embodiment is preferably applicable to a document subjected to the color material reduction process and output by a different image processing apparatus not supporting a system for processing the tag image information according to the present multifunction peripheral 10. In the present embodiment, the intensity of the color material reduction process is estimated from the analysis of the image data, as described above. Alternatively, information indicating the intensity of the color material reduction process may be included in the tag information.

In the above-described color material reduction information acquisition process according to the present embodiment, the color material reduction information is detected and acquired from the image data.

Figure 9:
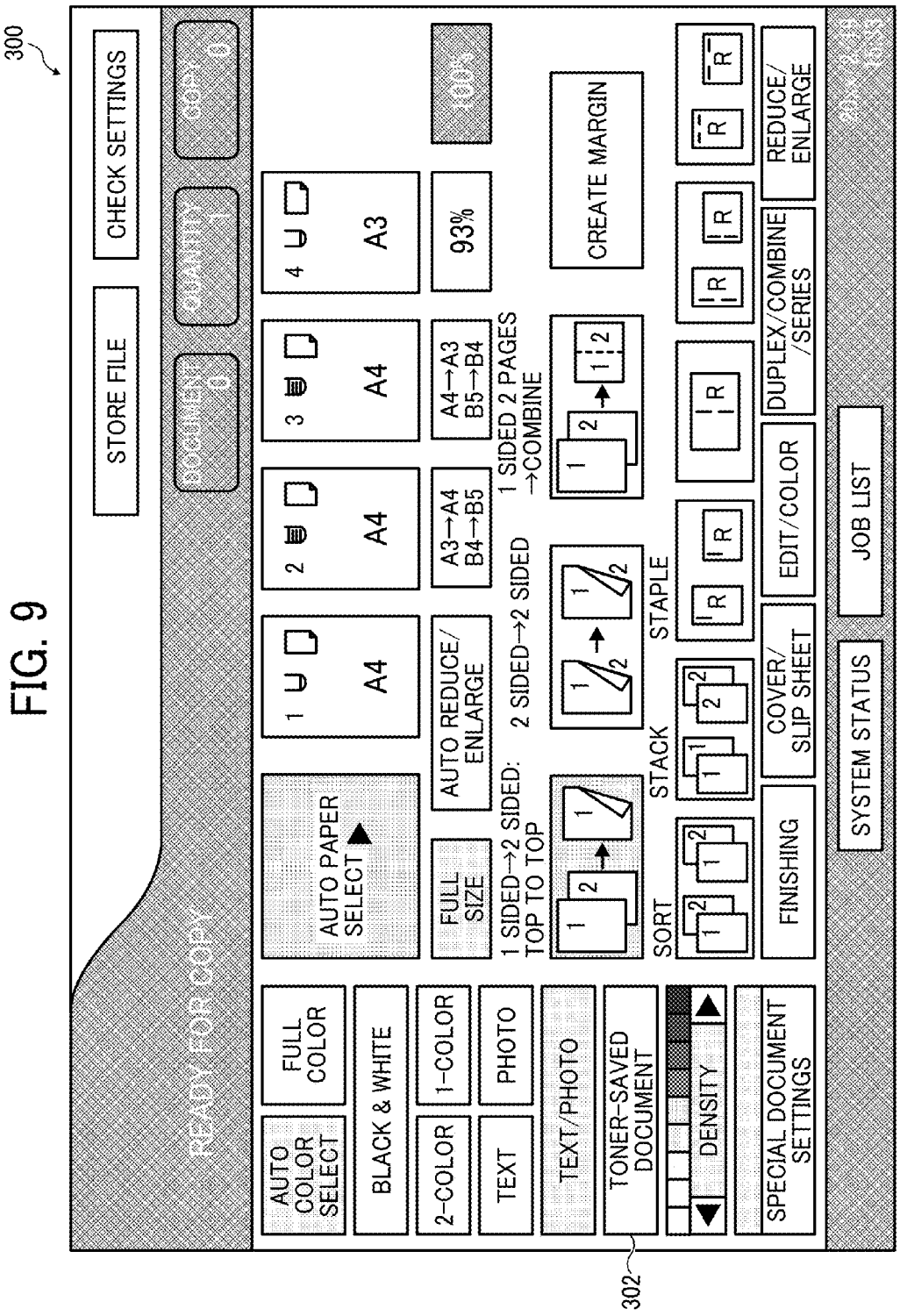
FIG. 9 is a diagram illustrating an example of an operation screen displayed on an operation panel according to still another embodiment of this disclosure.

With reference to FIG. 9, a description will now be given of a color material reduction information acquisition process according to still another embodiment.

In this embodiment, the color material reduction information acquisition block 104 acquires the color material reduction information based on user specification via the operation panel 28. FIG. 9 is a diagram illustrating an operation screen 300 displayed on the operation panel 28 in the present embodiment. As illustrated in FIG. 9, the operation screen 300 for setting conditions for copying includes components of a normal graphical user interface (GUI) and a button 302 for reporting that the document to be read is a toner-saved document subjected to the color material reduction process.

If the fact that the document has been subjected to the color material reduction process is input via the operation screen 300 as illustrated in FIG. 9, the multifunction peripheral 10 performs the color material reduction inversion process properly reflecting that fact. The present embodiment may be modified to first determine whether or not the document has been subjected to the color material reduction process based on user specification and then estimate the intensity of the color material reduction process based on the density distribution.

According to the foregoing embodiments, regular image processing is preceded by the color material reduction inversion process that is performed on the document subjected to the color material reduction process based on the information embedded in the image output on the document or the information provided by the user via the operation panel 28, to thereby obtain image data close to the image data of the document not subjected to the color material reduction process and then perform the image processing on the image data. Consequently, deterioration in image quality of the output image is reduced. Further, according to the foregoing embodiments, the correction parameter for the color material reduction inversion process such as the density correction is selected based on the color material reduction information, thereby allowing simple mode bifurcation and a simple structure and facilitating implementation of the embodiments.

Further, according to the foregoing embodiments, the multifunction peripheral 10 has both a function of outputting an image by performing thereon the color material reduction process and a function of reading a document subjected to the color material reduction process by performing the color material reduction inversion process for cancelling the effects of the color material reduction process on the document. Alternatively, an image processing system may be configured in which the function of outputting an image by performing thereon the color material reduction process and the function of reading a document subjected to the color material reduction process by performing the color material reduction inversion process are distributed to separate image processing apparatuses.

An image processing apparatus, an image processing method, and an image processing system according to embodiments of this disclosure are capable of cancelling the effects of the color material reduction process on the document to be read, to thereby obtain image data having a density close to that of the original image of the document.

Further, the foregoing functional blocks may be implemented by a computer-executable program described in a legacy programming language such as assembler, C, C++, C#, or Java (registered trademark) or an object-oriented programming language, and may be distributed in a computer-readable recording medium, such as a read-only memory (ROM), an electrically erasable, programmable ROM (EEPROM), an erasable, programmable ROM (EPROM), a flash memory, a flexible disk, a compact disc ROM (CD-ROM), a CD-rewritable (CD-RW), a digital versatile disc-ROM (DVD-ROM), a DVD-RAM, DVD-RW, a Blu-ray Disc, a secure digital (SD) card, or a magneto-optical (MO) disc, or through a telecommunication line. Further, all or parts of the foregoing functional blocks may be implemented on a programmable device (PD) such as a field programmable gate array (FPGA), for example, or may be implemented as an application specific integrated circuit (ASIC). To implement the functional blocks on the PD, circuit configuration data (bit stream data) to be downloaded to the PD and data for generating the circuit configuration data described in a language such as hardware description language (HDL), very high speed integrated circuits hardware description language (VHDL), or Verilog-HDL may be distributed in a recording medium.

The above-described embodiments are illustrative and do not limit this disclosure. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an ASIC and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image processing apparatus comprising:
   a non-transitory medium including computer readable instructions; and
   one or more processors configured to execute the computer readable instructions to
      read a reduced document to generate image data;
      acquire color material reduction information reflecting a color material reduction process applicable to the reduced document;
      determine whether to correct the image data based on the acquired color material reduction information; and
      perform a density correction process on the image data if the determining unit has determined to correct the image data.

2. The image processing apparatus of claim 1, wherein the one or more processors are further configured to acquire the color material reduction information by extracting, from the image data, information added to the reduced document when an image is output on the reduced document after the color material reduction process.

3. The image processing apparatus of claim 1, wherein one or more processors are further configured to acquire the color material reduction information by estimating whether the color material reduction process has been performed on the reduced document based on a density distribution in the image data.

4. The image processing apparatus of claim 3, wherein the one or more processors are further configured to acquire the color material reduction information by estimating an intensity of the color material reduction process performed on the reduced document based on the density distribution in the image data, and
   perform the density correction process in accordance with the intensity of the color material reduction process indicated by the color material reduction information.

5. The image processing apparatus of claim 1, further comprising an operation panel,
   wherein the one or more processors are further configured to acquire the color material reduction information based on an input to the operation panel.

6. The image processing apparatus of claim 1, wherein the one or more processors are further configured to smooth a halftone-processed portion of the image data if the determining unit has determined to correct the image data.

7. The image processing apparatus of claim 1, wherein the one or more processors are further configured to separate the image data subjected to the density correction process into image areas.

8. The image processing apparatus of claim 1 wherein the processor is further configured to performing a density correction process by reconstructing the partial document based on the color material reduction information.

9. The image processing apparatus of claim 1 wherein the reduced document is a reduced toner document.

10. An image processing method comprising:
reading a reduced document to generate image data;
acquiring color material reduction information reflecting a color material reduction process applicable to the reduced document;
determining whether to correct the image data based on the acquired color material reduction information; and
performing a density correction process on the image data if the determining has determined to correct the image data.

11. The image processing method of claim 10, wherein the acquiring acquires the color material reduction information by extracting, from the image data, information added to the reduced document when an image is output on the reduced document after the color material reduction process.

12. The image processing method of claim 10, wherein the acquiring acquires the color material reduction information by estimating whether the color material reduction process has been performed on the reduced document based on a density distribution in the image data.

13. The image processing method of claim 12, wherein the acquiring acquires the color material reduction information by estimating an intensity of the color material reduction process performed on the reduced document based on the density distribution in the image data, and
wherein the performing performs the density correction process in accordance with the intensity of the color material reduction process indicated by the color material reduction information.

14. The image processing method of claim 10, further comprising separating the image data subjected to the density correction process into image areas.

15. The image processing method of claim 10, further comprising performing a halftone correction to smooth a halftone-processed portion of the image data if the determining has determined to correct the image data.

16. The image processing method of claim 10, wherein the acquiring acquires the color material reduction information based on an external input.

17. The image processing apparatus of claim 10 wherein the reduced document is a reduced toner document.

18. The image processing apparatus of claim 10 wherein performing a density correction process comprises,
reconstructing the partial document based on the color material reduction information.

19. An image processing system comprising:
a non-transitory medium including computer readable instructions; and
one or more processors configured to execute the computer readable instructions to
perform a color material reduction process on image data to be output if the color material reduction process is requested;
read a reduced document having an image output thereon based on the image data subjected to the color material reduction process to generate image data;
acquire color material reduction information reflecting the color material reduction process;
determine whether to correct the generated image data based on the acquired color material reduction information; and
perform a density correction process on the generated image data if the determining unit has determined to correct the generated image data.

20. The image processing system of claim 19, wherein the one or more processors are further configured to add the color material reduction information to the image data to be output if the color material reduction process is requested.

* * * * *